United States Patent Office 3,085,856
Patented Apr. 16, 1963

3,085,856
PRODUCTION OF PEROXYMONOPHOSPHORIC ACID AND A SALT THEREOF
Donald B. Lake, Wilmington, Del., and Gleb Mamantov, Niagara Falls, N.Y., assignors to E. I. du Pont de Nemours and Company, Wilmington, Del., a corporation of Delaware
No Drawing. Filed Mar. 11, 1958, Ser. No. 720,559
4 Claims. (Cl. 23—107)

This invention relates to an improved method of preparing peroxymonophosphoric acid and also to the production of a new and stable salt thereof.

Peroxymonophosphoric acid, $H_3PO_5$, is produced by the reaction of phosphorus pentoxide, hydrogen peroxide and water according to the equation:

$$P_2O_5 + 2H_2O_2 + H_2O = 2H_3PO_5$$

Schmidlin et al., Ber. 43, 1162 (1910), accomplished the preparation by employing the reactants in small increments while strongly cooling the reaction mixture, but that method is dangerous because of the high reactivity of the reactants with each other.

An improved method of producing the above peroxy acid is that of Heiderich, U.S.P. 2,765,216, employing phosphorus pentoxide which has first been heat-treated so as to reduce its reactivity with the other reactants. However, this method is time-consuming and results in relatively poor conversions to the peroxy acid.

The disadvantages of the above methods are largely overcome by the method described in the pending Mathre application Serial No. 642,972, filed February 28, 1957, and now abandoned, according to which the phosphorus pentoxide is first mixed with orthophosphoric acid, and the resulting mixture is reacted with aqueous hydrogen peroxide under cooling. While this method can be practiced to give relatively concentrated solutions of the peroxy acid at good conversions, it has the disadvantage of producing product acid containing large amounts of orthophosphoric acid, $H_3PO_4$. It has now been found that the stability of the peroxy acid decreases as the amount of orthophosphoric acid present is increased. Furthermore, the presence of large amounts of orthophosphoric acid is distinctly disadvantageous if it is desired to convert the peroxy acid to the new potassium salt described below.

It is an object of the invention to provide an improved method of preparing peroxymonophosphoric acid. A further object is an improved method of preparing this peroxy acid substantially free of orthophosphoric acid. A special object of the invention is the provision of a method of preparing monopotassium peroxymonophosphate, which is a new and valuable compound. Still further objects will be apparent from the following description.

The objects of the invention are accomplished by reacting phosphorus pentoxide with aqueous hydrogen peroxide in the presence of a liquid water-immiscible organic diluent which is inert towards the reactants and the reaction product under the conditions of use, and separating the inorganic phase containing the product peroxymonophosphoric acid from the reaction mixture. In a preferred embodiment of the invention, the inorganic phase containing the peroxymonophosphoric acid is reacted with a potassium compound of the group consisting of the hydroxide, carbonate and bicarbonate in an amount corresponding to from 0.5 to 1.5 moles of potassium ion per mole of peroxymonoperphosphoric acid present, and the resulting monopotassium peroxymonophosphate salt product is recovered from the reaction mixture.

The reaction to produce the peroxymonophosphoric acid should generally be carried out at a temperature not exceeding 40° C. to avoid excessive decomposition of the peroxy acid product. Temperatures not over 25° C. are preferred and those not exceeding 15° C., e.g. 0 to 15° C. are most preferred. Still lower temperatures limited only by the requirement of maintaining a liquid reaction medium which can be effectively agitated can also be used. The desired reaction temperature can be readily maintained by refrigeration and controlled addition of one or more of the reactants, e.g., phosphorus pentoxide or aqueous hydrogen peroxide, to the reaction medium under agitation. Preferably, the aqueous hydrogen peroxide is added to an agitated and cooled suspension of phosphorus pentoxide in the organic diluent while controlling the rate of addition and the amount of cooling so as to maintain the reaction mixture at the desired temperature. After addition of the hydrogen peroxide, agitation is preferably continued for an additional 1 to 5 hours to complete the reaction.

The proportions of hydrogen peroxide to phosphorus pentoxide are not critical and can be varied generally from about 1 to 10 moles of $H_2O_2$ per mole of $P_2O_5$. Preferably, at least 2, e.g., 2.2 to 4 moles, of $H_2O_2$ per mole of $P_2O_5$ will be used. The hydrogen peroxide most generally will be employed as an aqueous solution containing 70 to 90% $H_2O_2$. However, weaker solutions of concentrations as low as 30% $H_2O_2$, can be used if formation of relatively large amounts of orthophosphoric acid is not objectionable. Higher strength hydrogen peroxide, e.g., up to approximately 100%, can also be used if the water requirement of the reaction is supplied separately from the hydrogen peroxide. Most conveniently and preferably, an aqueous hydrogen peroxide solution of 80 to 90% strength will be employed to supply both the hydrogen peroxide and the water required for the peroxy acid reaction.

The mole ratio of $H_2O$ to $P_2O_5$ generally will range from 0.5 to 5. Preferably, the ratio will not substantially exceed 1, e.g., will range from 0.7 to 1.1, particularly when it is desired to avoid substantial concentrations of orthophosphoric acid in the product peroxy acid. Most generally it will be desired to carry out the reaction with substantially 1 mole of water per mole of $P_2O_5$.

The water-immiscible organic diluent employed can be any organic compound which is liquid at the reaction temperature and is inert or substantially so towards the reactants and reaction product under the conditions of use. The diluent should have a boiling point above the reaction temperature, and preferably above 40° C. Examples of such diluents are the saturated hydrocarbons such as hexane, heptane, dodecane, petroleum ether and cyclohexane; methylene chloride and carbon tetrachloride. A preferred class of diluents because of their high inertness and noninflammable properties are the saturated perhalogenated chlorofluoroalkanes such as 1,1,2-trichloro-1,2,2-trifluoroethane, 1,1,2,2 - tetrachloro-1,2-difluoroethane and trichloromonofluoromethane. The amount of diluent employed is not critical and will depend somewhat upon the temperature to be used, the rate at which the reaction is to be carried out and the effectiveness of agitation. Sufficient diluent should be used to permit effective moderation of the reaction. The weight ratio of diluent to $P_2O_5$ will generally range from about 1 to 20 or higher, preferably from about 4 to 10.

Following formation of the peroxy acid as described above, the inorganic phase of the reaction mixture containing the product peroxy acid is separated from the organic diluent phase, e.g., by decantation or equivalent methods. The product phase can be used per se as the source of peroxymonophosphoric acid for any desired use, for example, in preparing metal polishing compositions for use in polishing aluminum and copper surfaces according to the method of the pending application of Mathre and Sowards, Serial No. 647,980, filed March 25, 1957, and issued May 13, 1958, as U.S. Patent 2,834,659. The product phase, particularly when it is relatively free of orthophosphoric acid, can be advantageously converted to monopotassium peroxymonophosphate as described below. The organic phase separated from the peroxy acid reaction mixture can be reused repeatedly in further preparations of the peroxy acid.

The reaction between the peroxy acid and potassium hydroxide, carbonate or bicarbonate will also generally be carried out at a temperature not exceeding 40° C. in order to avoid excessive loss of active oxygen through decomposition. Temperatures not exceeding 25° C. are preferred and those of −20 to +20° C. are most preferred. The potassium compound reactant can be employed as a solid but is preferably used in the form of an aqueous solution; most preferably, it will be employed as a concentrated aqueous solution containing the compound at a concentration of from 20% by weight up to the saturation concentration.

The reaction to form the potassium salt can be carried out by adding both reactants simultaneously in suitable proportions to an agitated and cooled reaction mixture or the potassium compound reactant can be added to the agitated and cooled peroxy acid reactant. The mole ratio of potassium ion to $H_3PO_5$ should not exceed 1.5 and generally will range from 0.5 to 1.5. Greater proportions of the potassium ion reactant result in unstable product and should not be used. Preferably, this ratio will not exceed 1, the preferred range being 0.9 to 1. Smaller proportions of the potassium ion reactant, e.g., corresponding to a ratio as low as 0.5, can be used but result in lower conversions to the desired potassium salt, $KH_2PO_5$.

The reaction to produce the above salt occurs rapidly and becomes essentially complete as soon as the reactants are thoroughly mixed together. The above potassium salt can be recovered in somewhat impure form by evaporation of the reaction mixture to a solid residue, preferably by a freeze-drying method. A pure or relatively pure form of the salt can be obtained by fractionally crystallizing the crude solid salt product from water, and most preferably from a solvent mixture of water and a water-soluble organic solvent which is inert or substantially so under the conditions of use. Examples of such organic solvents are the saturated lower aliphatic alcohols such as methanol, ethanol, the propanols and t-buty alcohol, and the saturated lower aliphatic water-soluble ketones such as acetone and methyl ethyl ketone.

The invention is illustrated by the following examples in which all parts and percentages respecting concentration and purity of reactants and products are by weight.

EXAMPLE 1

To a slurry of 21.1 parts (0.149 mole) phosphorus pentoxide in 140 parts 1,1,2-trichloro-1,2,2-trifluoroethane, there were added during 45 minutes 18.8 parts (0.472 mole $H_2O_2$; 0.152 mole $H_2O$) of 85.4% aqueous hydrogen peroxide. The mixture was stirred rapidly and maintained at 5 to 10° C. during the addition and for 2 hours thereafter. After allowing the resulting mixture to form 2 layers which were separated by decantation, the inorganic layer was found by analysis to contain 86.0% $H_3PO_5$ and 10.4% $H_2O_2$. After standing at −10° C. over the week end, it contained 88.0% $H_3PO_5$ and 9.6% $H_2O_2$. Conversion of the $P_2O_5$ to $H_3PO_5$ was substantially quantitative.

To 30 parts of the above inorganic layer containing 26.4 parts (0.231 mole) $H_3PO_5$ there were added during 25 minutes 27.9 parts of a 43% KOH solution equal to 0.214 mole KOH. The mixture was stirred and maintained at −10 to 0° C. during the addition. The resulting mixture was freeze-dried (lyophilized) by freezing it at a temperature from −30 to −60° C., then placing it under a vacuum at between 0.01 and 0.3 mm. Hg overnight. There resulted 36 parts of a sticky solid salt product containing 2.2% active oxygen present as $H_2O_2$ and having a total active oxygen content of 11.4%.

The above salt product was dissolved in the minimum amount of water at 40° C. and the solution was then maintained for one day at −10° C. After a few hours at that temperature, ethanol was added until 2 phases had formed and seed crystals of $KH_2PO_5$ were added. The precipitate which had formed at the end of the one day period was filtered off, dried under vacuum, and found by analyses to contain 92.8% $KH_2PO_5$ and 0.37% $H_2O_2$. After again recrystallizing the product crystals by the same method, they were found by analyses to be free of $H_2O_2$ and to contain 96.4% $KH_2PO_5$. The twice recrystallized product lost no active oxygen during 36 days at room temperature in a desiccator over concentrated sulfuric acid.

EXAMPLE 2

To a slurry of 34.4 parts (0.242 mole) $P_2O_5$ in 280 parts 1,1,2-trichloro-1,2,2-trifluoroethane, there were added during 100 minutes, 29.7 parts (0.745 mole $H_2O_2$; 0.243 mole $H_2O$) of 85.3% aqueous hydrogen peroxide. The mixture was stirred and maintained at 0 to 5° C. during the addition and for 1 hour thereafter, then allowed to stand overnight. After separating the inorganic layer containing the product peroxy acid by decanting, that layer was found by analyses to contain 71.6% $H_3PO_5$ and 25.4% $H_2O_2$.

47.3 parts of the above layer of the product peroxy acid containing 33.8 parts (0.296 mole) $H_3PO_5$ were reacted with 35.6 parts of a 43% KOH solution equal to 0.273 mole KOH at a temperature of −20 to −10° C. The resulting mixture was freeze-dried as described in Example 1 to obtain a crude salt product which, after one crystallization as described in Example 1, contained 97.6%, $KH_2PO_5$ and 0.52% $H_2O_2$. After a second recrystallization the product was analyzed and found to contain 25.38% K and 20.5% P (theoretical values for $KH_2PO_5$ are 25.7% and 20.4%, respectively) and 10.31% active oxygen, none of which was present at $H_2O_2$. These values correspond to a $KH_2PO_5$ content of 98.0%. The purified salt showed no loss of active oxygen in 21 days at room temperature but was somewhat hygroscopic. At 80% relative humidity and room temperature, it picked up 2.9% water in the first day and about 0.5% in each of the second and third days, but suffered no loss of active oxygen. A one molar solution of the salt has a pH of about 4.7.

It will be noted from the data of Examples 1 and 2 that recrystallization of the salt product increased product purity. Removal of hydrogen peroxide impurity is important since the presence of hydrogen peroxide decreases stability of the salt. Hydrogen peroxide impurity can be removed by other ways, e.g., by vacuum stripping at room or slightly elevated temperature, or the hydrogen peroxide can be similarly stripped from the peroxy acid before its reaction with potassium hydroxide. However, the recrystallization procedure of the examples is preferred.

EXAMPLE 3

The general procedure of Examples 1 and 2 was followed in preparing the peroxy acid except that cyclohexane was employed as the organic diluent. The peroxy acid product contained 87.6% $H_3PO_5$ and 9.7% $H_2O_2$.

EXAMPLE 4

The general procedures of Examples 1 and 2 were followed in preparing the peroxy acid except that acetonitrile was used as the organic diluent. With this diluent, the reaction mixture did not separate into phases, it smelled strongly of acetic acid and analyses showed it to contain only 6.51% $H_3PO_5$ and 2.62% $H_2O_2$.

Monopotassium peroxymonophosphate has a distinct

X-ray powder diffraction pattern different from the pattern for the corresponding simple phosphate of the formula $KH_2PO_4$. The approximate "d" values of the major peaks of the patterns for the two salts are given below along with the relative intensities. The X-ray powder diffraction patterns for these two compounds were obtained by means of a Norelco X-Ray Diffraction Unit using $CuK\alpha$ radiation and employing standard technique.

*"d" Values in Angstroms and Relative Intensities of Major Peaks of X-Ray Powder Diffraction Patterns*

| $KH_2PO_5$ | | $KH_2PO_4$ | |
|---|---|---|---|
| "d" Value | Relative Intensity [1] | "d" Value | Relative Intensity [1] |
| 5.5 | 4 | 5.1 | 2 |
| 4.47 | 3 | 3.73 | 10 |
| 4.30 | 4 | 3.00 | 2 |
| 3.59 | } 10 | 2.90 | 9 |
| 3.52 | | 2.64 | 2 |
| 3.31 | } 9 | 2.34 | 3 |
| 3.27 | | 1.96 | 8 |
| 3.15 | 8 | | |
| 2.82 | 5 | | |
| 2.64 | } 5 | | |
| 2.61 | | | |
| 2.49 | 5 | | |
| 2.07 | } 4 | | |
| 2.04 | | | |
| 1.80 | 4 | | |

[1] 10 represents maximum intensity.

The present method of preparing peroxymonophosphoric acid is an improvement over prior methods in that ordinary commercial phosphorus pentoxide can be used and in that the product peroxy acid can be readily prepared in a concentrated relatively pure form at high conversions. Both the peroxy acid and its new salt, $KH_2PO_5$, are usable for metal polishing, bleaching and other purposes. The salt product is especially useful since it is a solid stable product more suitable than the acid for shipping, handling and storing purposes.

We claim:
1. The method of producing monopotassium peroxymonophosphate comprising reacting peroxymonophosphoric acid with a potassium compound of the group consisting of the hydroxide, the carbonate and the bicarbonate in proportions of from 0.5 to 1.5 moles of potassium ions per mole of peroxymonophosphoric acid, and recovering from the reaction mixture a solid monopotassium peroxymonophosphate product.
2. The method of claim 1 employing the reactants in proportions corresponding to from 0.9 to 1 mole of potassium ions per mole of peroxymonophosphoric acid.
3. The method of claim 1 wherein the monopotassium peroxymonophosphate product is treated to remove free hydrogen peroxide therefrom.
4. Solid stable monopotassium peroxymonophosphate of the formula $KH_2PO_5$.

References Cited in the file of this patent

UNITED STATES PATENTS

| | | |
|---|---|---|
| 2,007,510 | Thornton | July 9, 1935 |
| 2,063,029 | Coleman et al. | Dec. 8, 1936 |
| 2,595,198 | Leffarge et al. | Apr. 29, 1952 |
| 2,765,216 | Heiderich | Oct. 2, 1956 |
| 2,811,419 | Hartlapp et al. | Oct. 29, 1957 |
| 2,817,577 | Balthis | Dec. 24, 1957 |
| 2,843,457 | Pernert | July 15, 1958 |

OTHER REFERENCES

"Hydrogen Peroxide," Schumb et al., Reinhold Publishing Corp., 1955, American Chemical Society Monograph Series No. 128, page 664 specifically relied upon.

"Lexicon," Hoffmann, Band 1, 1 Halfte Wasserstoff Bis Silber, No. 1–31, Leipzig, 1917, pages 130, 235, and 236 specifically relied upon.